June 15, 1948.     G. H. PALM     2,443,568
RECIPROCATORY FLUID PRESSURE OPERATED MOTOR
WITH PISTON ACTUATED DISTRIBUTING VALVE
Filed Jan. 1, 1945     2 Sheets-Sheet 1

Inventor:
George H. Palm
By Williams, Bradbury & Hinkle
Attorneys.

Patented June 15, 1948

2,443,568

UNITED STATES PATENT OFFICE 2,443,568

RECIPROCATORY FLUID PRESSURE OPERATED MOTOR WITH PISTON ACTUATED DISTRIBUTING VALVE

George H. Palm, Chicago, Ill., assignor to Stewart-Warner Corporation, Chicago, Ill., a corporation of Virginia Application January 1, 1945, Serial No. 570,904

7 Claims. (Cl. 121—164)

1

My invention relates generally to pneumatic motors, and more particularly to improved pneumatic motors of the reciprocatory type, such as are used for driving lubricant compressors.

In many types of lubricant compressors and similar pumping apparatus, it is desirable to provide a reciprocatory pneumatic motor for the reciprocation of the pump piston. Such motors have been used to a considerable extent, particularly for so-called barrel pumps which are designed for attachment to the drum in which the lubricant is shipped. Such pumps have, in the past, usually been provided with a valve mechanism external to the pump and operated by exposed rods or the like. Such exposed portions of the pump usually accumulate grime and generally present an unsatisfactory appearance. Due to the rough handling to which the apparatus is frequently subjected, such exposed valve actuating mechanisms readily become damaged.

It is therefore an object of my invention to provide an improved compressed air operated motor for lubricant pumps, in which the valve and the valve actuating mechanism are enclosed within the cylinder housing of the motor.

A further object is to provide an improved valve and valve actuating mechanism for air motors.

A further object is to provide an improved means for lubricating pneumatic motors used for the operation of lubricant compressors and the like.

Other objects will appear from the following description, reference being had to the accompanying drawings, in which.

Figure 1:
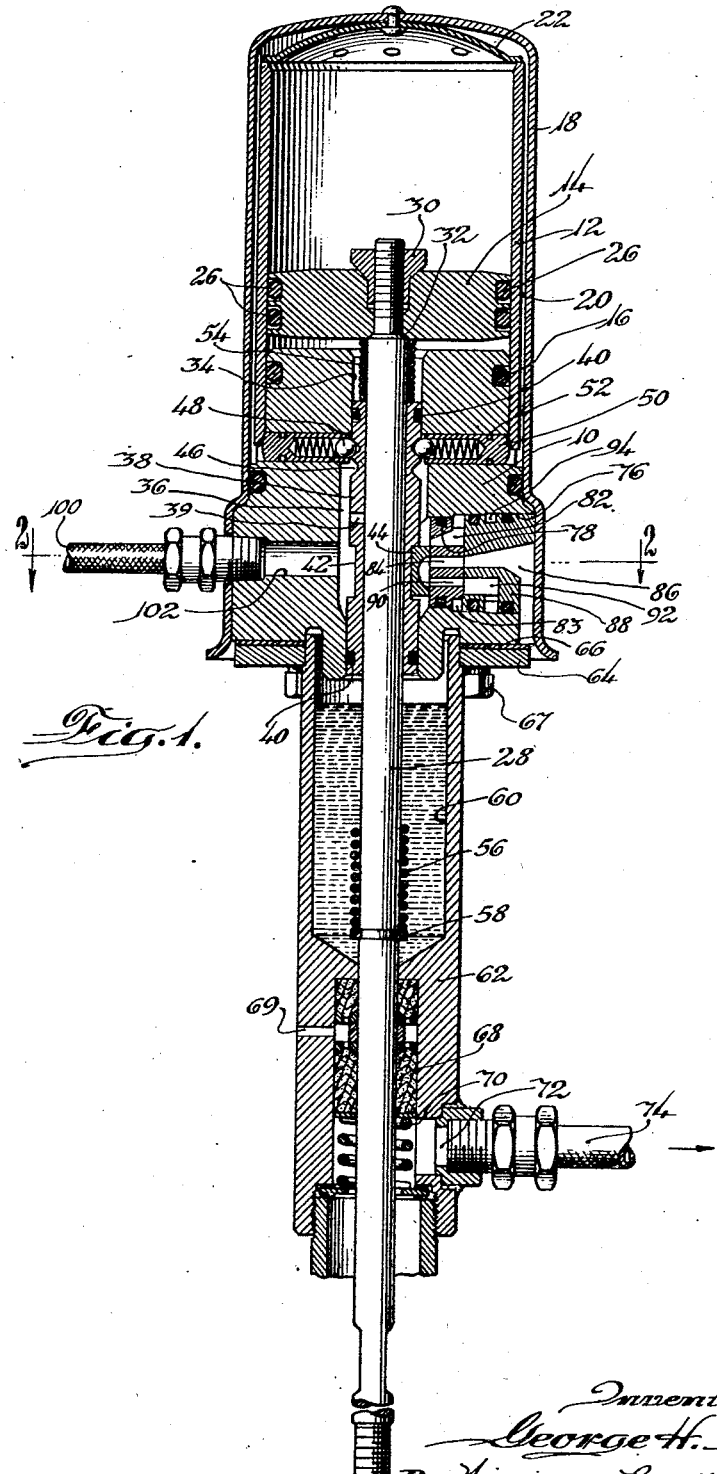
Fig. 1 is a central longitudinal sectional view of the compressor.

Referring to Fig. 1, the air motor comprises a body 10 having secured thereto a cylinder 12 in which a piston 14 is reciprocable. The cylinder 12 is in the form of a tubular liner and fits over the reduced diameter upper end portion of the body 10, a gasket 16 being provided to make airtight the connection between the cylinder 12 and body 10. The cylinder 12 is surrounded by a housing 18 which is of sufficiently large internal diameter to provide an air passageway 20 between it and the external wall of the cylinder 12. A stiff apertured spring cap 22 is riveted to the housing 18, and has its

2 peripheral edge engaging the upper end of the cylinder 12 to hold the latter in the position shown. The housing 18 is secured to the body 10 by a plurality of screws 24, its assembly being accomplished in a manner such that the spring cap 22 is stressed. The piston 14 is provided with suitable piston rings 26 and is secured to the upper end of a piston rod 28 by a nut 30, which holds the piston 14 against a beveled shoulder 32 formed on the rod 28.

The body 10 has a bore 34 extending axially therethrough, the central portion of this bore being of enlarged diameter to provide an air passageway 36. A valve operating sleeve 38 is guided for free sliding movement in the reduced diameter end portions of the bore 34, suitable gaskets 40 being provided to make an airtight seal. The sleeve 38 is provided with an oil escape port 39 and has a sliding fit on the piston rod 28, such that oil adhering to the rod 28 may seep from the port 39. The sleeve 38 is provided with an annular groove 42 for cooperation with a D-slide valve 44. The sleeve also has a pair of annular grooves 46 for cooperation with spring pressed ball detents 48 which are carried in suitable retainers 50. The retainers 50 are provided with suitable sealing rings 52 and are held in place by the lower edge portion of the cylinder 12.

A valve actuating coil spring 54 surrounds the piston rod 28 and is located between the piston 14 and the upper end of the sleeve 38, while a similar coil spring 56 is located between the lower end of the sleeve 38 and a split ring washer 58 which fits in a suitable groove formed in the piston rod 28.

An oil chamber 60 is provided in a fitting 62 which is welded to a plate 64. A passageway 61 (Fig. 3) leads from the bottom of the cylinder 10 to the chamber 60, this passageway having a branch 63 through which oil may be added, this branch being normally closed by a filler plug 65. The plate 64 is secured to the body 10 by cap screws 67, a gasket 66 sealing this joint. The fitting 62 is provided with suitable packing 68, which is held in sealing engagement with the piston rod by a compressed spring 70. Any lubricant leaking past the lower portion of the packing 68 may escape through a port 69. The fitting 62 may form the upper part of the lubricant pump and thus provides an outlet bushing 72 for connection with a hose 74 for conveying lubricant from the pump.

The body 10 has a stepped diameter bore 76 therein. A seat 78 for the D-valve 44 is pressed into the smallest diameter portion of the bore 76, being provided with a suitable ring gasket to assure that it will be airtight.

Figure 2:
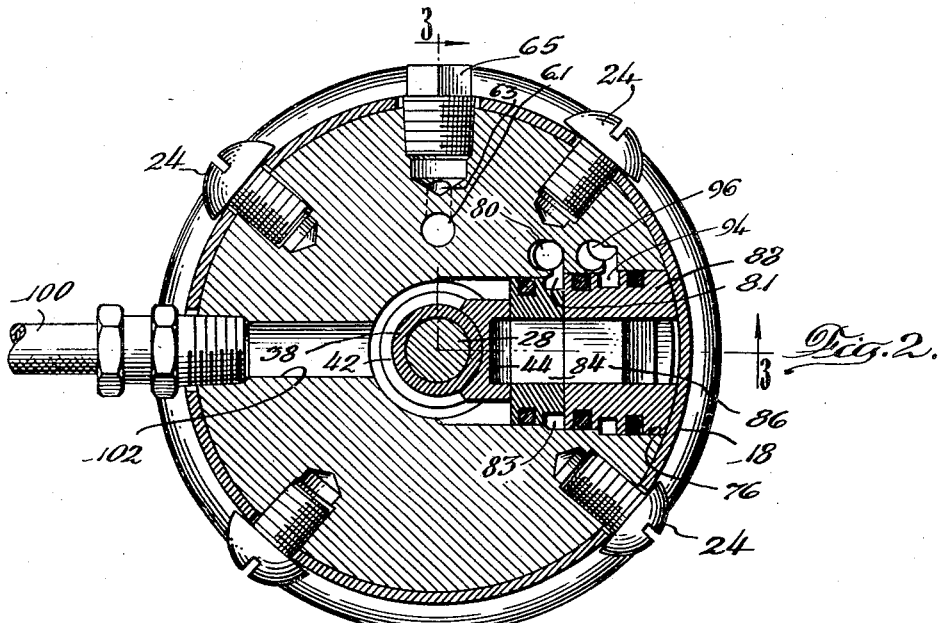
Fig. 2 is a transverse sectional view taken on the line 2—2 of Fig. 1.
Figure 3:
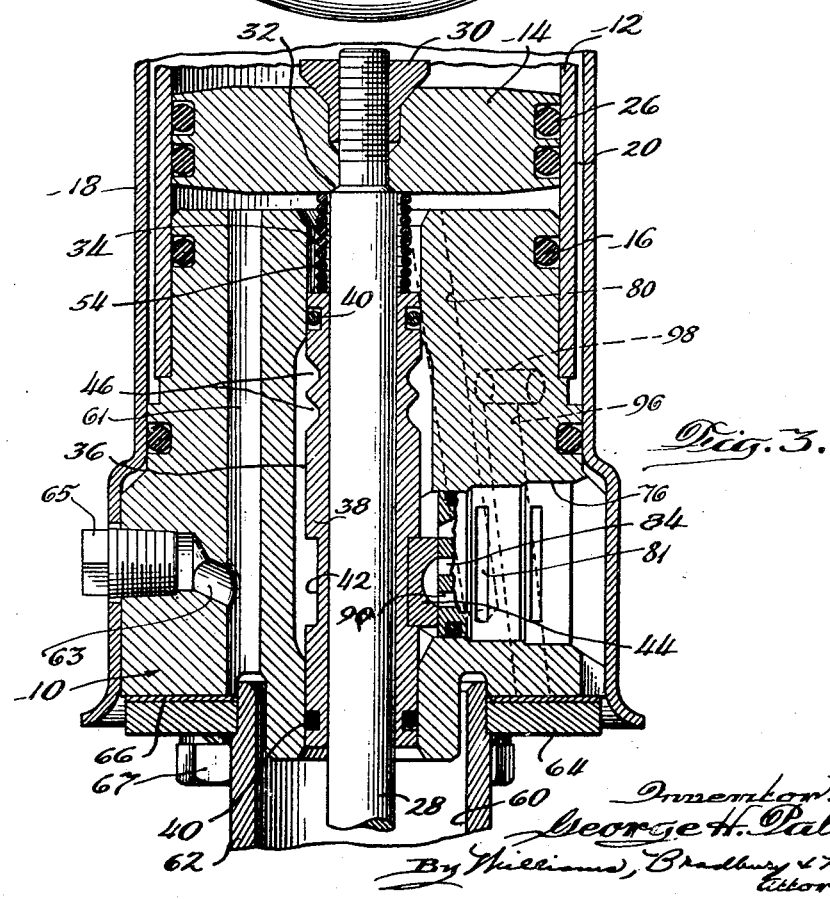
Fig. 3 is a broken sectional view taken on the line 3—3 of Fig. 2.

As best shown in Figs. 2 and 3, a duct 80 having a port 81 connects the space beneath the piston 14 with a passageway 82 and annular groove 83 formed in the valve seat 78. A central port 84 (Fig. 1) in the valve seat 78 communicates with a registering passageway 86 formed in a plug 88 suitably sealed in the large and intermediate diameter portions of the bore 76, the passageway 86 communicating freely with the atmosphere. A third port 90 formed in the valve seat 78 communicates with a passageway 92 formed in the plug 88 and this passageway communicates with an annular groove 94 extending around the plug 88. The annular groove 94 communicates with a passageway 96 (Figs. 2 and 3) which, through a transverse extension 98, communicates with the space 20 between the cylinder 12 and the housing 18.

Air under pressure for the operation of the motor is illustrated as being supplied through a hose 100 suitably secured to the end of an inlet passageway 102, the latter leading into the enlarged diameter portion 36 of the bore 34. Assuming that the hose 100 is connected to a suitable source of compressed air and that the parts are in the positions in which they are shown in Fig. 1, the compressed air will flow through the enlarged portion 36 and into the passageway 82 of the valve seat member, through the annular groove 83, and hence through the passageway 80 to the space beneath the piston 32. Such air flow will cause the upward stroke of the piston, the air from above the piston being discharged through the passageway 20, passageways 98 and 96, annular groove 94, passageways 92, 90, 84, and 86, to the atmosphere. As the piston approaches the upper end of its stroke, the upper end of the spring 56 will engage the lower end of the sleeve 38, and when the piston reaches the upper end of its stroke, this spring will have been compressed sufficiently to overcome the retaining effect of the detents 48 and snap the sleeve 38, together with the D-slide valve 44, upwardly, so that the detents will engage in the lower groove 46. When in this position the passageway through the D-slide valve 44 will connect passageways 82 and 84, while the port 90 will be in communication with the space 36 to which the compressed air is being supplied. Thus air under pressure will flow through the port 90, passageway 92, annular groove 94, passageways 96, 98, and 20, to the upper end of the cylinder, causing the piston to reverse its direction of motion, the air beneath the piston 14 being discharged through the passageway 80, annular groove 83, passageway 82, through the D-slide valve, and passageways 84 and 86 to the atmosphere. Such movement of the piston 14 will continue until the spring 54 is compressed sufficiently to overcome the holding force of the detents 48, whereupon the sleeve 38 and D-slide valve 82 will be snapped to their lower position as shown in Fig. 1.

Due to the provision of the oil reservoir 60, the piston rod 82 will be adequately lubricated and some of this lubricant will seep through the opening 39 formed in the sleeve 38, so as to be carried by the air to the cooperating surfaces of the valve 44 and its seat 78. Some of the oil will also be carried as a mist or as a film with the air flowing into the cylinder 12 so that the latter will be adequately lubricated. Excess oil in the cylinder 12 will be returned to the reservoir 60 through the passageway 61.

In one normal use of the air motor, the lubricant is pumped under pressure through the discharge hose 74 to a part to be supplied with lubricant, under the control of a suitable valve. Whenever this valve is closed, the pump stops operating as soon as the lubricant pressure built up is sufficient to balance the air pressure operating on the piston 14. As soon as the lubricant discharge valve is opened, the motor will again commence operation, since it is apparent that it has no dead center position.

It will be observed that the air motor may be quickly and easily assembled, and that the various parts may be made with relatively large tolerances, since gaskets are utilized to seal all the joints between the parts which are required to be pressure tight. It will also be clear that the motor may be very quickly and easily serviced, since upon removal of the screws 24 and the connection for the air hose 100, the remaining parts may readily be removed for cleaning or replacement.

While I have shown and described particular embodiments of my invention, it will be apparent that numerous variations and modifications thereof may be made without departing from the underlying principles of the invention. I therefore desire, by the following claims, to include within the scope of my invention, all such variations and modifications by which substantially the results of my invention may be obtained through the use of substantially the same or equivalent means.

I claim:

1. In a reciprocating fluid pressure operated motor, the combination of a body, a cylinder detachably secured thereto, a housing surrounding said cylinder and holding it against said body, a piston reciprocable in said cylinder, a rod secured to said piston and extending through said body, a sleeve guided for reciprocation in said body and slidably surrounding said piston rod with working clearance, an oil reservoir secured to the lower end of said body, said piston rod extending through said reservoir packing means surrounding said piston rod below the reservoir to prevent escape of oil from said reservoir, the working clearance between said sleeve and rod providing a passageway for conducting oil from said reservoir to the central portion of said sleeve, said body providing a space adjacent said sleeve with a supply passage for fluid under pressure leading into said space, a valve connected to said sleeve for actuation thereby and operative to connect the opposite ends of the cylinder alternately with said space for supplying fluid under pressure to said cylinder, and said sleeve having a passage leading from its central portion into said space to supply oil to be distributed to the cylinder with the pressure fluid.

2. A reciprocatory air motor comprising a body, a cylinder comprising a tube fitting over the upper portion of said body, a housing closed at its upper end and secured at its lower end to said body, said housing enclosing said cylinder and providing means for holding said cylinder in engagement with said body, said housing and cylinder being spaced from one another to provide a passageway for the flow of air from said body to the remote end of said cylinder, a piston in the cylinder, a conduit leading into said body from a source of air under pressure and a valve mechanism located wholly within said body operative for alternately connecting said source of air under pressure to the opposite ends of said cylinder while simultaneously alternately connecting the other ends of said cylinder to the atmosphere.

3. In a fluid pressure operated reciprocating motor, the combination of a body having an axial bore extending therethrough, a cylinder at one end of said body, a piston reciprocable in said cylinder and having a piston rod secured thereto, a sleeve slidable in said bore and on said piston rod, means providing seals between the end portions of said sleeve and the wall of said bore, said body having a passageway for supplying fluid under pressure to said bore intermediate the ends of said sleeve, a D-slide valve having two operative positions in which it respectively admits fluid under pressure to the opposite ends of the cylinder and connects the other end of the cylinder to a vent, said D-slide valve being operatively connected to said sleeve, detent means for holding said sleeve in position to locate said D-slide valve in either of its two operative positions, resilient means operative to shift said sleeve in opposite directions as said piston approaches the opposite ends of its stroke respectively, and a seat for said D-slide valve providing a plurality of ports communicating respectively with the opposite ends of said cylinder and with the atmosphere.

4. In a fluid pressure operated reciprocatory motor, the combination of a body having a bore extending axially therethrough, a sleeve reciprocable in said bore, means forming seals between the end portions of said sleeve and the walls of said bore, a radial bore extending into said axial bore, said radial bore having portions of different diameters, a D-slide valve operatively connected to said sleeve, a seat for said slide valve comprising a ported member fitted in the inner end of said radial bore, said body having a plurality of passageways, an element fitted in the outer end of said radial bore and having a pair of passageways respectively connecting ports in said seat with the passageways in said body, said element having an additional passageway communicating with a port in said seat and with the atmosphere.

5. In a fluid pressure operated motor as defined in claim 4, a cylinder mounted on said body, a housing removably fitted over said cylinder and telescopically fitted over the body closing the outer end of said radial bore and serving to retain said element therein.

6. A reciprocatory air motor comprising a cylindrical body having an axial bore, a piston rod slidable in said bore with a piston on the end of said rod above the body, the body having an upper portion of reduced diameter, a cylinder comprising a tube open at both ends and slidably fitted over the piston with the lower end of said cylinder telescopically engaging said upper portion of the body, a cylindrical housing closed at its upper end and mounted on the body by telescopic engagement of its lower end with a lower portion of said body, means detachably securing said housing to the body, said housing having an internal diameter greater than the external diameter of said cylinder and having means holding the upper end of the cylinder in spaced relation to the closed upper end of the housing to provide a passageway for the flow of air from the body into said upper end of the cylinder, and valve mechanism housed in said body and actuated by the movement of the piston rod to control the supply of air under pressure to said passageway and to the lower end of the cylinder.

7. In a reciprocatory air motor as defined in claim 6, the said valve mechanism including a sleeve slidable on said piston rod and within said body, spaced abutment means on the rod engageable with opposite ends of the sleeve respectively and with lost motion, and snap action means comprising spaced grooves in the sleeve and spring pressed detents in the body, said body having a bore radial to the sleeve for each detent unit, such unit comprising a plug slidably fitted in said bore, a spring pocketed in said plug and a contact element urged by said spring against the sleeve, said cylinder closing the outer end of the bore and retaining the detent unit therein when fitted over the upper end portion of the body.

GEORGE H. PALM.

REFERENCES CITED

The following references are of record in the file of this patent:

UNITED STATES PATENTS

| Number | Name | Date |
| --- | --- | --- |
| 785,336 | Storle | Mar. 21, 1905 |
| 1,006,431 | Cameron | Oct. 17, 1911 |
| 1,765,921 | Joy | June 24, 1930 |
| 2,057,364 | Bystricky | Oct. 13, 1936 |
| 2,273,349 | Farley et al. | Feb. 17, 1942 |
| 2,366,777 | Farley et al. | Jan. 9, 1945 |